US012559169B2

(12) United States Patent
Kaltenbach et al.

(10) Patent No.: US 12,559,169 B2
(45) Date of Patent: Feb. 24, 2026

(54) PUMP APPARATUS AND ELECTROHYDRAULIC POWER STEERING MECHANISM FOR A VEHICLE

(71) Applicant: KNORR-BREMSE Systeme fuer Nutzfahrzeuge GmbH, Munich (DE)

(72) Inventors: Christian Kaltenbach, Stuttgart (DE); Rainer Lang, Schwaebisch Gmuend (DE); Klaus Peterreins, Filderstadt (DE); Benjamin Bartole, Stuttgart (DE); Jonas Rink, Stuttgart (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 427 days.

(21) Appl. No.: 18/277,598

(22) PCT Filed: Feb. 4, 2022

(86) PCT No.: PCT/EP2022/052767
§ 371 (c)(1),
(2) Date: Aug. 17, 2023

(87) PCT Pub. No.: WO2022/175121
PCT Pub. Date: Aug. 25, 2022

(65) Prior Publication Data
US 2024/0132149 A1     Apr. 25, 2024
US 2024/0227929 A9     Jul. 11, 2024

(30) Foreign Application Priority Data
Feb. 18, 2021     (DE) ..................... 10 2021 103 810.3

(51) Int. Cl.
B62D 5/065     (2006.01)
B62D 5/06      (2006.01)
B62D 5/093     (2006.01)

(52) U.S. Cl.
CPC ............. B62D 5/065 (2013.01); B62D 5/064 (2013.01); B62D 5/093 (2013.01)

(58) Field of Classification Search
CPC .......... F04B 49/22; B62D 5/064; B62D 5/065
See application file for complete search history.

(56) References Cited

U.S. PATENT DOCUMENTS 6,144,909 A     11/2000  Sakamaki et al.
6,223,529 B1     5/2001  Achten
(Continued)

FOREIGN PATENT DOCUMENTS

DE     100 56 388 A1     5/2001
DE     697 36 296 T2     5/2007
(Continued)

OTHER PUBLICATIONS

International Search Report (PCT/ISA/210) issued in PCT Application No. PCT/EP2022/052767 dated Jun. 14, 2022 with English translation (4 pages).
(Continued)

*Primary Examiner* — Valentin Neacsu
*Assistant Examiner* — Hosam Shabara
(74) *Attorney, Agent, or Firm* — Crowell & Moring LLP

(57)                ABSTRACT

A pump apparatus for an electrohydraulic power steering mechanism for a vehicle includes a hydraulic pump, a working line, a pressure generator, a first control line, a preliminary pressure line, a compensation tank, a shut-off valve having a control inlet, and a second control line. The hydraulic pump is designed to pump a hydraulic oil out of a pump chamber to a pump outlet of the hydraulic pump. The pressure generator has a pressure generation inlet and a pressure generation outlet, and the pressure generator is designed to generate, using an inlet pressure present at the pressure generation inlet, an outlet pressure which can be
(Continued)

provided at the pressure generation outlet and is lower than the inlet pressure. As a result, a preliminary pressure can be generated in the pump chamber.

12 Claims, 2 Drawing Sheets

(56) References Cited

U.S. PATENT DOCUMENTS

| | | | | |
|---|---|---|---|---|
| 6,279,675 | B1 * | 8/2001 | Bohner | B62D 5/003 |
| | | | | 180/417 |
| 6,488,112 | B1 | 12/2002 | Kleist | |
| 6,843,341 | B2 * | 1/2005 | Grebe | B62D 5/065 |
| | | | | 180/421 |
| 11,255,429 | B2 * | 2/2022 | Giorgio Bort | B60K 6/12 |
| 11,512,716 | B2 * | 11/2022 | Gerngross | F15B 7/006 |
| 2012/0240564 | A1 * | 9/2012 | Wesolowski | B60K 6/12 |
| | | | | 60/416 |
| 2019/0270369 | A1 | 9/2019 | Giorgio Bort et al. | |

FOREIGN PATENT DOCUMENTS

| | | | |
|---|---|---|---|
| DE | 10 2007 053 263 | A1 | 5/2009 |
| WO | WO 2005/105549 | A1 | 11/2005 |

OTHER PUBLICATIONS

German-language Written Opinion (PCT/ISA/237) issued in PCT Application No. PCT/EP2022/052767 dated Jun. 14, 2022 with English translation (8 pages).

German-language Office Action issued in German Application No. 10 2021 103 810.3 dated Nov. 26, 2021 (8 pages).

Cover Page of EP 1 737 722 A1 published Jan. 3, 2007 (1 page).

International Preliminary Report on Patentability (PCT/IB/326 & PCT/IB/373) issued in PCT Application No. PCT/EP2022/052767 dated Aug. 31, 2023, including English translation (German-language Written Opinion (PCT/ISA/237), filed on Aug. 17, 2023) (7 pages)

* cited by examiner 105  135  130  175  197  196  185  102

155
190
140
199
145
110
160
192

100
194
120
180
125
170
115
165

150  193

135  200  102

140
199
110
160

222
220
120
115

150

PUMP APPARATUS AND ELECTROHYDRAULIC POWER STEERING MECHANISM FOR A VEHICLE

BACKGROUND AND SUMMARY

The present disclosure relates to a pump apparatus for an electrohydraulic power steering apparatus for a vehicle and to an electrohydraulic power steering apparatus.

Hydraulic power steering apparatuses (HPS: Hydraulic Power Steering) for heavy utility vehicles have a block steering system, a pipework system, a pump and a compensation container for hydraulic oil. The hydraulic pump is in this instance permanently driven by the internal combustion engine. By continuously circulating the hydraulic oil, it is always sufficiently controlled in terms of temperature and the block steering system is thus permanently heated.

Against this background, an object of the present approach is to provide an improved pump apparatus and an improved electrohydraulic power steering apparatus for a vehicle.

This object is achieved with a pump apparatus and an electrohydraulic power steering apparatus having the features of the independent claims.

Advantageously, the pump apparatus enables a pre-pressure generation. Purely by way of example, an application of the pump apparatus can then be carried out in particular in an electrohydraulic steering system of a vehicle. The advantages which can be achieved with the approach set out involve a pump device, for example, for use together with an electrohydraulic power steering apparatus, which is capable of functioning independently of an internal combustion engine and which further converts a system pressure into a temporarily applied pre-pressure for a hydraulic oil tank being provided.

A pump apparatus, for example, for an electrohydraulic power steering apparatus for a vehicle, has a hydraulic pump, a working line, a pressure generation device, a first control line, a pre-pressure line, a compensation tank, a shut-off valve having a control input and a second control line. The hydraulic pump is constructed to pump a hydraulic oil from a pump chamber to a pump output of the hydraulic pump. The working line is formed for directing the hydraulic oil to a consumer, for example, a steering system, wherein a working connection of the working line is fluidically connected to the pump output. The pressure generation device has a pressure generation input and a pressure generation output, wherein the pressure generation device is constructed, using an input pressure which is applied at the pressure generation input, to produce an output pressure which can be provided at the pressure generation output and which is lower than the input pressure. The first control line fluidically connects the pump output to the pressure generation input. The pre-pressure line fluidically connects the pressure generation output to the pump chamber. In this manner, the output pressure which can be provided by the pressure generation device at the pressure generation output can be used to increase the pressure in the pump chamber. The compensation tank is formed to store hydraulic oil. The shut-off valve is constructed, depending on a pressure applied at the control input of the shut-off valve, to assume a valve open position or a valve closed position, wherein the shut-off valve fluidically connects the compensation tank to the pump chamber in the valve open position and fluidically separates the compensation tank from the pump chamber in the valve closed position. The second control line fluidically connects the pump output to the control input. Using the pressure generation device, the pressure of the hydraulic oil in the pump chamber can consequently be increased. Consequently, a pre-pressure generation for the hydraulic pump can be carried out.

A corresponding electrohydraulic power steering apparatus can be used for vehicle steering in utility vehicles, for example, with an axle load of up to eight tons. The power steering apparatus is provided with a so-called "EPS" (Electronic Power Steering) power steering apparatus based on an electrohydraulic principle. Such an EPS system is characterized by a discontinuous operating behavior, that is to say, the hydraulic oil in the hydraulic circuit of the steering system is conveyed only during steering movements by a pump unit, that is to say, in accordance with the "power on demand" principle. If no steering is carried out, the hydraulic oil remains stationary, as does the motor pump unit comprising the hydraulic pump and drive. This type of power steering apparatus can be used to act as a "power on demand" steering system, for example, in electrified utility vehicles without any internal combustion engine or in order to implement automated driving requirements, for example, by means of driver assistance systems, such as DAS/ADAS (Level 1-2) and HAD (Level 3-5) independently without any driver intervention. Tests have shown that it may be advantageous for the power steering apparatus to be operated with hydraulic oil which already assumes a very high pressure level in the tank, for example, greater than atmospheric pressure. The electrohydraulic power steering apparatus set out in this instance is therefore advantageously capable of converting a system pressure which is produced by the hydraulic pump into a temporarily applied pre-pressure for the compensation tank.

The first control line and, additionally or alternatively, second control line of the pump apparatus may, for example, be blind lines. The shut-off valve may have a restoring spring which is constructed to move the shut-off valve into the valve open position when the pressure at the control input is below a threshold value. A fluid connection between the compensation tank and the pump chamber can thus be enabled at any time when the pressure falls below the threshold value and, additionally or alternatively, immediately separated when the pressure is at or above the threshold value, for example, during a high-pressure phase.

According to an embodiment, the pump apparatus may also have the pump chamber in which the hydraulic pump is received. The pump chamber may further be formed to receive a drive for driving the hydraulic pump. The pump apparatus may also comprise such a drive which is constructed to drive the hydraulic pump. The drive may have an electric motor and be arranged additionally or alternatively in the pump chamber. The pump chamber may further be configured to be free from air bubbles. This affords a possibility of decoupling the pump drive from another drive, for example, a vehicle drive.

The working line may have a first branch which opens in the first control line and may additionally or alternatively have a second branch which opens in the second control line. The second branch may be arranged between the pump output and the first branch. Thus, the first control line and additionally or alternatively the second control line may be directly connected to the working line, for example, directly without any additional components being coupled between.

The pressure generation device may, for example, have a dual piston. In order to produce the pressure, the dual piston may have different diameters.

It is further advantageous for the pressure generation device to be constructed, using the input pressure applied at the pressure generation input, to produce the output pressure which can be provided at the pressure generation output and which is higher than atmospheric pressure. In this manner, the pressure of the hydraulic oil in the pump chamber may be adjusted to a value which is higher than atmospheric pressure.

A corresponding electrohydraulic power steering apparatus for a vehicle has a mentioned pump apparatus and the consumer in the form of an electrohydraulic steering gear. The electrohydraulic steering gear is fluidically connected to the working line. The steering gear may be a block steering system which is or can be connected to a steering wheel. The steering gear may have at least one or two working chambers, wherein the at least one working chamber is suitable for moving a piston which can be coupled to a steering rod of the steering system in one direction. The optional second working chamber may be suitable for moving the piston which can be coupled to the steering rod of the steering system in a direction counter to the direction. A completely extensive steering system is thus provided.

According to an embodiment, the power steering apparatus may further have a control device which is constructed, in response to a steering activation signal which represents an actuation of a steering wheel of the vehicle, to output an activation signal which is formed to activate the hydraulic pump and, additionally or alternatively, in response to a steering idle signal which represents an idle state of the steering wheel of the vehicle, to output a deactivation signal which is formed to deactivate the hydraulic pump. The "power on demand" principle can thus be implemented for the power steering, an activation of the hydraulic pump for power steering is thus carried out only when there is also a steering activation.

Exemplary embodiments of the approach set out in this instance are explained in greater detail below in the following description with reference to the figures.

BRIEF DESCRIPTION OF THE DRAWINGS

In the following description of advantageous embodiments of the present approach, the same or similar reference numerals are used for elements which are illustrated in the various Figures and which have a similar action, wherein a repeated description of these elements is dispensed with.

DETAILED DESCRIPTION OF THE DRAWINGS

Figures 1, 2:
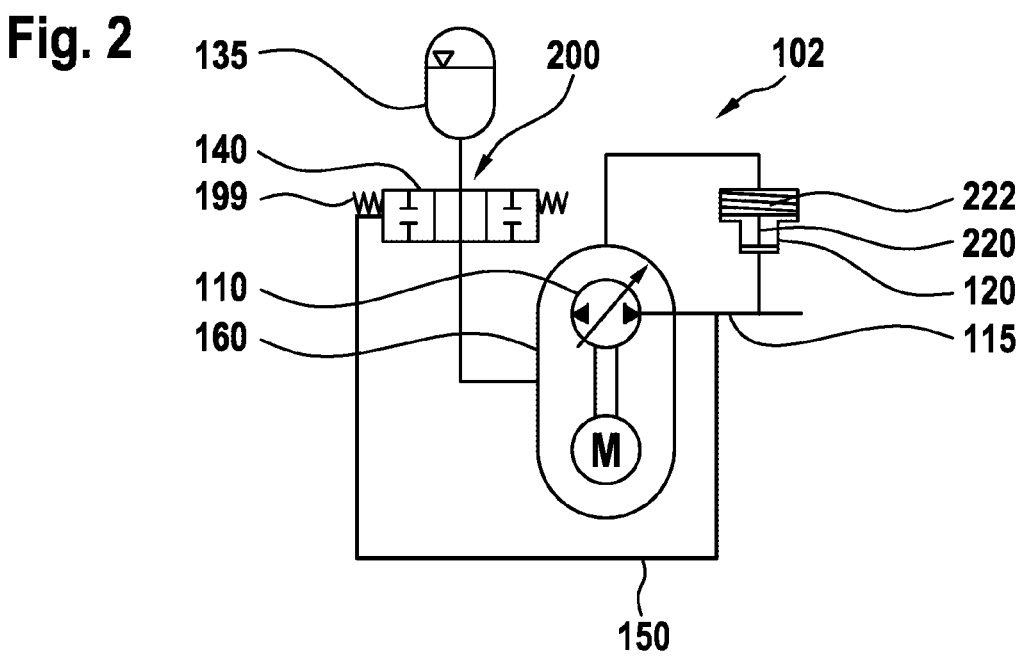
FIG. 1 is a schematic illustration of a pump apparatus for a vehicle having an electrohydraulic power steering apparatus according to an exemplary embodiment.
FIG. 2 is a schematic illustration of a pump apparatus according to an exemplary embodiment.

FIG. 1 shows a schematic illustration of a vehicle 100 having a pump apparatus 102 for an electrohydraulic power steering apparatus 105 according to an exemplary embodiment. The pump apparatus 102 comprises a pre-pressure unit and is according to this exemplary embodiment part of the electrohydraulic power steering apparatus 105. The use of the pump apparatus 102 together with a steering system of the vehicle 100 is in this instance selected purely by way of example. The pump apparatus 102 can correspondingly also be used for other application areas, including outside the vehicle sector, in order to provide a working pressure.

With regard to the exemplary embodiment of the electrohydraulic power steering apparatus 105, FIG. 1 shows only a cut-out in order to illustrate the principle of a pre-pressure unit of the pump apparatus 102. Only a portion of a hydraulic circuit diagram is therefore illustrated, a corresponding hydraulic complete system of the power steering apparatus 105 is illustrated below with reference to FIG. 3.

Purely by way of example, the electrohydraulic power steering apparatus 105 according to this exemplary embodiment is received on or in the vehicle 100, which is in the form according to this exemplary embodiment of a utility vehicle, for example, with an axial load of up to eight tons. The vehicle 100 according to an exemplary embodiment is an electrified or highly automated drivable vehicle 100. Alternatively, the pump apparatus 102 may be installed in a different type of vehicle or in a machine or an installation.

The pump apparatus 102 has a hydraulic pump 110, a working line 115, a pressure generation device 120, a first control line 125, a pre-pressure line 130, a compensation tank 135, a shut-off valve 140 with a control input 145 and a second control line 150. The compensation tank 135 comprises an oil reservoir with air in order to enable a temperature-related expansion. Optionally, an oil level indicator is coupled to the compensation tank. The hydraulic pump 110 is constructed to pump a hydraulic oil 155 from a pump chamber 160 to a pump output 165 of the hydraulic pump 110. The working line 115 is formed for directing the hydraulic oil 155 to a consumer 170, wherein a working connection 175 of the working line 115 is fluidically connected to the pump output 165. Purely by way of example, the consumer 170 is in the form of a steering system of the vehicle 100. For example, the steering system comprises an electrohydraulic steering gear. The pressure generation device 120 is used for oil pre-pressure generation. The pressure generation device 120 has a pressure generation input 180 and a pressure generation output 185. The first control line 125 fluidically connects the pump output 165 to the pressure generation input 180. The pre-pressure line 130 connects the pressure generation output 185 in fluid terms to the pump chamber 160. The pressure at the pressure generation input 180 acts as a drive in order to pretension the hydraulic oil which is in the working chamber 160 using the pressure generation device 120. With the exception of any leakage, there is no connection between the pressure generation input 180 and the pressure generation output 185. According to an exemplary embodiment, the pressure generation device 120 has a stepped piston which acts as a type of gear mechanism in order to reduce the pressure applied at the pressure generation input 180 to a significantly lower pressure at the pressure generation output 185. According to an exemplary embodiment, the pressure generation device 120 is in the form of a pressure converter which during the operation of the hydraulic pump 110 uses high input pressure which is produced by the hydraulic pump 110 and which is applied at the pressure generation input 180 in order to provide at the pressure generation output 185 a low output pressure. According to an exemplary embodiment, the pressure generation device 120 is configured in such a manner that the output pressure provided at the pressure generation output 185 is lower than the high input pressure applied at the pressure generation input 180, but higher than atmospheric pressure.

According to an exemplary embodiment, the pressure generation device 120 has a first space which is connected to the pressure generation input 180 and a second space which is connected to the pressure generation output 185. The two spaces are separated from each other by means of a dual piston which at the side of the first space has a smaller piston surface-area than at the side of the second space.

According to an exemplary embodiment, a restoring spring for restoring the dual piston is arranged in the second space.

The compensation tank 135 is formed for storing the hydraulic oil 155. The shut-off valve 140 is constructed, depending on a pressure applied at the control input 145 of the shut-off valve 140, to assume a valve open position 190 or a valve closed position, wherein the shut-off valve 140 fluidically connects the compensation tank 135 to the pump chamber 160 in the valve open position 190 and fluidically separates the compensation tank 135 from the pump chamber 160 in the valve closed position. The second control line 150 fluidically connects the pump output 165 to the control input 145.

According to this exemplary embodiment, the power steering apparatus 105 further has the pump chamber 160, a drive 192 for driving the hydraulic pump 110 and/or a control device 193.

The hydraulic pump 110 and/or the drive 192 are according to this exemplary embodiment received in the pump chamber 160. According to this exemplary embodiment, the drive 192 has an electric motor or is in the form of an electric motor. According to this exemplary embodiment, the pump chamber 160 is further configured to be free from air bubbles. According to this exemplary embodiment, the consumer 170 is fluidically connected to the working line 115. According to this exemplary embodiment, the consumer 170 is by way of example a block steering system which is or can be connected to a steering wheel 194 of the vehicle 100. According to this exemplary embodiment, the consumer 170 has at least one working chamber which can be acted on with pressure via the working line 115. According to this exemplary embodiment, at least one working chamber is used for moving a piston which can be coupled to a steering rod. The at least one working chamber is also referred to as a working space below. According to an exemplary embodiment, the steering wheel 194 is part of the power steering apparatus 105. In the case of a fully automated vehicle, a steering wheel 194 may where applicable be dispensed with.

According to this exemplary embodiment, the working line 115 has a first branch 196 which opens in the first control line 125 and/or a second branch 197 which opens in the second control line 150. According to this exemplary embodiment, the second branch 197 is arranged between the pump output 165 and the first branch 196. According to this exemplary embodiment, the first control line 125 and/or second control line 150 are blind lines.

According to this exemplary embodiment, the shut-off valve 140 has a restoring spring 199 which is constructed to move the shut-off valve 140 when the pressure is below a threshold value at the control input 145 into the valve open position 190 shown in this instance.

According to this exemplary embodiment, the pressure generation device 120 has a dual piston. In order to produce the pressure at the pressure generation output 185, the dual piston has according to this exemplary embodiment different diameters at the opposing ends. According to this exemplary embodiment, the pressure generation device 120 is constructed to use the pressure of the hydraulic oil 155 applied at the pressure generation input 180 in order to adjust the pressure applied at the pressure generation output 185 to a value which is above atmospheric pressure.

The control device 193 is by way of example constructed, in response to a steering activation signal which represents an activation of the steering wheel 194 or a steering request of a steering control system, to output an activation signal which is constructed to activate the drive 192 and/or the hydraulic pump 110 and/or, in response to a steering idle signal which represents an idle state of the steering wheel 194, to output a deactivation signal which is constructed to deactivate the drive 192 and/or the hydraulic pump 110.

The power steering apparatus 105 set out in this instance produces a pre-pressure system for an electrohydraulic "Electronic Power Steering" steering gear, "EPS steering gear" for short.

The EPS power steering apparatus 105 follows a fully integral plug and play approach. In this instance, the hydraulic oil circuit is decoupled from a vehicle drive such as an internal combustion engine or electric motor of the vehicle 100 and fitted as a compact drive unit to the block steering.

Tests have shown that it may be advantageous to operate a power steering apparatus with hydraulic oil 155 which already assumes in the tank a pressure level greater than atmospheric pressure. The power steering apparatus 105 set out in this instance is capable of converting the system pressure produced by the hydraulic pump 110 into a temporarily applied pre-pressure for the compensation tank 135. In this instance, it is ensured that the hydraulic oil 155 can continue to freely expand, for example, as a result of the influence of temperature. The approach set out in this instance without an additional device enables pre-pressure to be produced using the installed auxiliary steering pump.

FIG. 1 shows an idle position without any pump activity of the hydraulic pump 110, the pump chamber 160 and a tank chamber of the compensation tank 135 are connected in the idle position. A pre-pressure generator is schematically illustrated for a working space. There is the working line 115 which provides the hydraulic oil 155 for the working space. In addition, there are the two control lines 125, 150. The first control line 125 taps hydraulic oil in a blind line and produces via the dual piston with different diameters a pressure which is greater than atmospheric pressure. This pressure can be produced since the pre-pressure line 130 which leads into the air-free pump chamber 160 which can also be referred to as the "engine compartment" is fitted directly at the large cylinder side of the dual piston. According to this exemplary embodiment, the second control line 150 is also in the form of a blind line and controls the valve 140 so that during the high-pressure phase one of the two working chambers separates the compensation tank 135 from the pump chamber 160. As a result of this separation, the hydraulic oil which is considered to be incompressible at low pressure can be compressed without (notable) volume reduction.

FIG. 2 shows a schematic illustration of a pump apparatus 102 according to an exemplary embodiment. In this instance, this may be the pump apparatus 102 which is described in FIG. 1 and the shut-off valve 140 of which according to this exemplary embodiment is shown in the valve closed position 200.

When the pump apparatus 102 is used together with a steering system, as illustrated with reference to FIGS. 1 and 3, the pump apparatus 102 represents only one of two pre-pressure units and a cut-out of a complete system.

In connection with a steering system, a steering operation will now be described with reference to FIG. 2. A pump activity of the hydraulic pump 110 ensures in this instance a temporary separation and produces pre-pressure. The shut-off valve 140 is in the event of small pressures in the power steering apparatus 105 opened as shown in FIG. 1 and thus provides a way of compensating for the oil volume, it can flow freely. If pre-pressure is produced, the valve 104 shuts off and separates the pump chamber 160 temporarily completely from the compensation tank 135 which is also referred to as a compensation container. The pump 110 can if necessary draw off the pretensioned hydraulic oil. In the shut-off valve 140, the control line 150 bridges the restoring spring 199 so that the valve 140, as illustrated in this instance, is closed. If the pressure in the second control line 150 drops, the restoring spring 199 restores the valve 140. The pretensioning enables the pump 110 to more rapidly fill the pump volume without the risk of the oil supply breaking off at the intake side of the pump 110 and the pump 110 becoming damaged, for example, cavitation, aeration.

FIG. 2 shows with respect to the pressure generation device 120 a dual piston 220 and a restoring spring 222 for restoring the dual piston 220.

Figure 3:
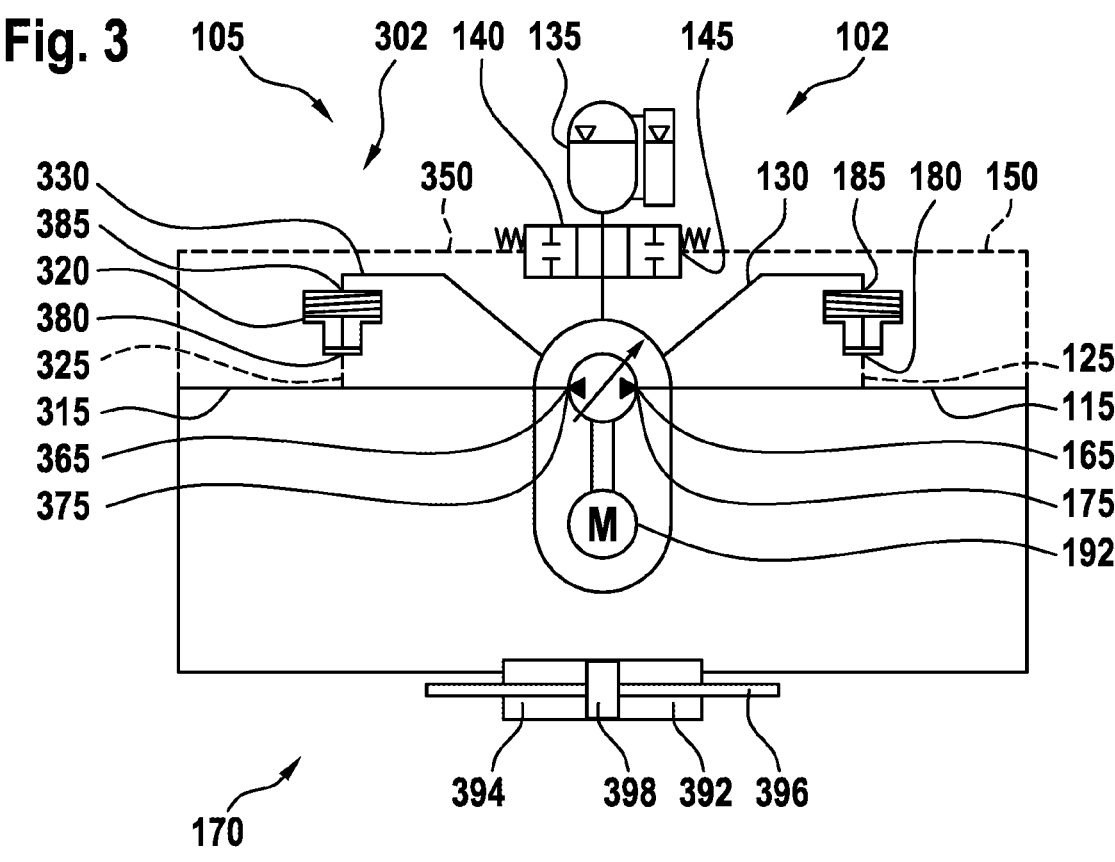
FIG. 3 is a schematic illustration of an electrohydraulic power steering apparatus according to an exemplary embodiment.

FIG. 3 shows a schematic illustration of an electrohydraulic power steering apparatus 105 according to an exemplary embodiment. In this instance, an exemplary embodiment may be the power steering apparatus described with reference to FIG. 1.

The pump apparatus 102 has, in addition to the features already described with reference to FIG. 1, an additional working line 315, an additional pressure generation device 320, an additional first control line 325 and an additional pre-pressure line 330. The shut-off valve 140 has an additional control input 345 which is coupled to an additional second control line 350. The hydraulic pump 110 is configured to be able to be controlled, for example, with two rotation directions. The hydraulic pump 110 is constructed to pump the hydraulic oil 155 in a first operating state, for example, in a first rotation direction, from the pump chamber 160 to the pump output 165, and in a second operating state, for example, in a second rotation direction, to pump from the pump chamber 160 to another pump output 365.

The additional working line 315 is formed to direct the hydraulic oil to the consumer 170, wherein an additional working connection 375 of the additional working line 315 is fluidically connected to the additional pump output 365. The additional pressure generation device 320 is used in accordance with the pressure generation device 120 for pre-pressure generation. The additional pressure generation device 320 has an additional pressure generation input 380 and an additional pressure generation output 385. The additional first control line 325 fluidically connects the additional pump output 365 to the additional pressure generation input 380. The additional pre-pressure line 330 fluidically connects the additional pressure generation output 385 to the pump chamber 160.

According to an exemplary embodiment, the additional pressure generation device 320 is formed in accordance with the pressure generation device 120 so that the pressure at the additional pressure generation input 380 acts as a drive in order to pretension the hydraulic oil which is in the working space 160 using the additional pressure generation device 320.

Figure 4:
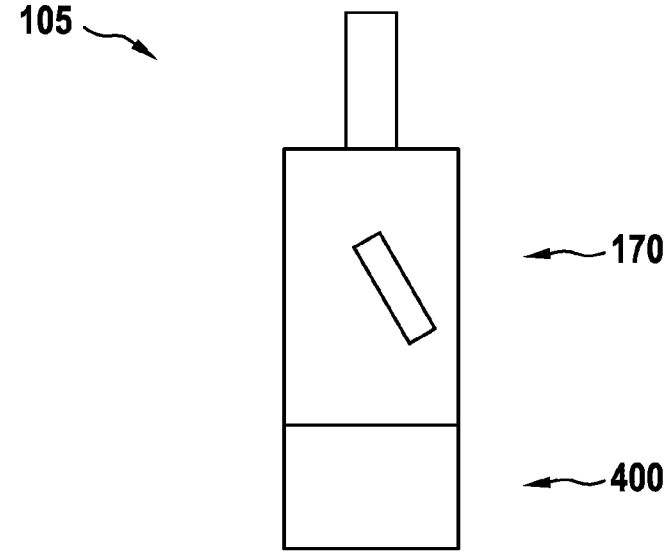
FIG. 4 is a perspective illustration of an electrohydraulic power steering apparatus according to an exemplary embodiment.

FIG. 4 shows a perspective illustration of an electrohydraulic power steering apparatus 105 according to an exemplary embodiment. In this instance, this may be an exemplary embodiment of an electrohydraulic power steering apparatus 105 described in FIG. 1 or FIG. 2.

The EPS power steering apparatus 105 follows a fully integral plug and play approach. In this instance, the hydraulic oil circuit is decoupled from the internal combustion engine or electric motor of the vehicle 100 and fitted as a compact drive unit 400 to the steering system 170 in the form of the block steering system.

LIST OF REFERENCE NUMERALS

100 Vehicle
102 Pump apparatus
105 Electrohydraulic power steering apparatus
110 Hydraulic pump
115 Working line
120 Pressure generation device
125 First control line
130 Pre-pressure line
135 Compensation tank
140 Shut-off valve
145 Control input
150 Second control line
155 Hydraulic oil
160 Pump chamber
165 Pump output
170 Consumer
175 Working connection
180 Pressure generation input
185 Pressure generation output
190 Valve open position
192 Drive
193 Control device
194 Steering wheel
196 First branch
197 Second branch
199 Restoring spring
200 Valve closed position
220 Dual piston
222 Restoring spring
315 Additional working line
320 Additional pressure generation device
325 Additional first control line
330 Additional pre-pressure line
345 Additional control input
350 Additional second control line
365 Additional pump output
375 Additional working connection
380 Additional pressure generation input
385 Additional pressure generation output
392 First working chamber
394 Second working chamber
396 Steering rod
398 Piston
400 Drive unit

The invention claimed is:

1. A pump apparatus for an electrohydraulic power steering apparatus for a vehicle, comprising:
   a hydraulic pump that pumps a hydraulic oil from a pump chamber to a pump output of the hydraulic pump;
   a working line for directing the hydraulic oil to a consumer, wherein a working connection of the working line is fluidically connected to the pump output;
   a pressure generator having a pressure generation input and a pressure generation output, wherein the pressure generator is constructed, using an input pressure which is applied at the pressure generation input, to produce an output pressure which can be provided at the pressure generation output and which is lower than the input pressure;
   a first control line which fluidically connects the pump output to the pressure generation input;

a pre-pressure line which fluidically connects the pressure generation output to the pump chamber in order to increase a pressure of the hydraulic oil in the pump chamber;

a compensation tank for the hydraulic oil;

a shut-off valve having a control input, wherein the shut-off valve, depending on a pressure applied at the control input, assumes a valve open position or a valve closed position, wherein the shut-off valve fluidically connects the compensation tank to the pump chamber in the valve open position and fluidically separates the compensation tank from the pump chamber in the valve closed position; and a second control line which fluidically connects the pump output to the control input.

2. The pump apparatus as claimed in claim 1, wherein the shut-off valve has a restoring spring that moves the shut-off valve into the valve open position when the pressure at the control input is below a threshold value.

3. The pump apparatus as claimed in claim 1, further comprising:

the pump chamber in which the hydraulic pump is received.

4. The pump apparatus as claimed in claim 1, further comprising the steering system which is fluidically connected to the working line.

5. The pump apparatus as claimed in claim 1, further comprising:

a drive which is constructed to drive the hydraulic pump.

6. The pump apparatus as claimed in claim 5, wherein the drive has an electric motor and/or is arranged in the pump chamber.

7. The pump apparatus as claimed in claim 1, wherein the working line has a first branch which opens in the first control line and/or has a second branch which opens in the second control line.

8. The pump apparatus as claimed in claim 1, wherein the pressure generator has a dual piston.

9. The pump apparatus as claimed in claim 1, wherein the pressure generator is constructed, using the input pressure applied at the pressure generation input, to generate the output pressure which can be provided at the pressure generation output and which is higher than atmospheric pressure.

10. The pump apparatus as claimed in claim 1, wherein the hydraulic pump is constructed to pump the hydraulic oil from the pump chamber in a controllable manner to the pump output or another pump output of the hydraulic pump, and wherein the pump apparatus further comprises:

an additional working line for directing the hydraulic oil to the consumer, wherein an additional working connection of the additional working line is fluidically connected to the additional pump output;

an additional pressure generator having an additional pressure generation input and an additional pressure generation output, wherein the additional pressure generator is constructed, using an additional input pressure which is applied at the additional pressure generation input, to produce an additional output pressure which can be provided at the additional pressure generation output and which is lower than the additional input pressure;

an additional first control line which fluidically connects the additional pump output to the additional pressure generation input;

an additional pre-pressure line which fluidically connects the pressure generation output to the pump chamber in order to increase the pressure of the hydraulic oil in the pump chamber; and an additional second control line which fluidically connects the additional pump output to an additional control input of the shut-off valve, wherein the shut-off valve, depending on a pressure which is applied at the additional control input, assumes the valve open position or the valve closed position.

11. An electrohydraulic power steering apparatus for a vehicle, comprising:

an electrohydraulic steering gear; and a pump apparatus for the electrohydraulic power steering apparatus, the pump apparatus comprising:

a hydraulic pump that pumps a hydraulic oil from a pump chamber to a pump output of the hydraulic pump;

a working line for directing the hydraulic oil to the electrohydraulic steering gear, wherein a working connection of the working line is fluidically connected to the pump output;

a pressure generator having a pressure generation input and a pressure generation output, wherein the pressure generator is constructed, using an input pressure which is applied at the pressure generation input, to produce an output pressure which can be provided at the pressure generation output and which is lower than the input pressure;

a first control line which fluidically connects the pump output to the pressure generation input;

a pre-pressure line which fluidically connects the pressure generation output to the pump chamber in order to increase a pressure of the hydraulic oil in the pump chamber;

a compensation tank for the hydraulic oil;

a shut-off valve having a control input, wherein the shut-off valve, depending on a pressure applied at the control input, assumes a valve open position or a valve closed position, wherein the shut-off valve fluidically connects the compensation tank to the pump chamber in the valve open position and fluidically separates the compensation tank from the pump chamber in the valve closed position; and a second control line which fluidically connects the pump output to the control input.

12. The electrohydraulic power steering apparatus as claimed in claim 11, further comprising:

a control unit which is configured, in response to a steering activation signal which represents an activation of a steering wheel of the vehicle, to:

output an activation signal which is formed to activate the hydraulic pump, and/or in response to a steering signal which represents an idle state of the steering wheel of the vehicle, output a deactivation signal which is formed to deactivate the hydraulic pump.

* * * * *